United States Patent [19]
Okada et al.

[11] Patent Number: 5,020,913
[45] Date of Patent: Jun. 4, 1991

[54] FIBER OPTIC GYRO WITH TEMPERATURE COMPENSATED PHASE RAMP

[75] Inventors: Kenichi Okada, Tokyo; Shu Tanigawa, Fukuoka; Masashi Nishino, Tokyo, all of Japan

[73] Assignee: Japan Aviation Electronics Industry Limited, Tokyo, Japan

[21] Appl. No.: 497,307

[22] Filed: Mar. 22, 1990

[30] Foreign Application Priority Data

Mar. 23, 1989 [JP] Japan .................................. 1-72764

[51] Int. Cl.$^5$ ............................................... G01B 9/02
[52] U.S. Cl. ................................................ 356/350
[58] Field of Search ...................................... 356/350

[56] References Cited

U.S. PATENT DOCUMENTS

| 4,456,376 | 6/1984 | Carrington et al. | 356/350 |
| 4,705,399 | 11/1987 | Graindorge et al. | 356/350 |
| 4,848,910 | 7/1989 | Dupraz | 356/350 |

FOREIGN PATENT DOCUMENTS

0172391 2/1986 European Pat. Off.
3104786 9/1982 Fed. Rep. of Germany.
2157425 10/1985 United Kingdom ................ 356/350

Primary Examiner—Samuel Turner
Attorney, Agent, or Firm—Pollock, Vande Sande and Priddy

[57] ABSTRACT

A modulated phase difference is detected between two rays of light phase modulated by a phase modulator, having propagated through an optical fiber coil in opposite directions and interfering with each other. A ramp voltage controlled in polarity and frequency in accordance with the detected phase difference is generated. The ramp voltage is applied to the phase modulator to control it so that a maximum phase shift of light thereby is $2\pi k$ rad (where $k=\pm 1, \pm 2, \ldots$). To correct the temperature characteristic of the phase modulator, a peak value control circuit creates a reference voltage corrected by a voltage detected by a temperature sensor and controls the peak value of the ramp voltage by the reference voltage, thereby ensuring that the maximum phase shift of light in the phase modulator is always $2\pi k$ rad regardless of temperature changes.

8 Claims, 6 Drawing Sheets

FIBER OPTIC GYRO WITH TEMPERATURE COMPENSATED PHASE RAMP

BACKGROUND OF THE INVENTION

The present invention relates to a closed-loop-type zero-system fiber optic gyro.

A wide-dynamic-range, low-drift fiber optic gyro that has been proposed in the past has an arrangement in which a phase modulator, formed as an optical modulator, is provided at one end of an optical fiber coil, a ramp voltage for phase modulation is applied to the phase modulator to provide a phase difference between two rays of light propagating through the optical fiber coil, a phase difference between two rays of light which propagate through the optical fiber coil and interfere with each other is detected from the output of a photodetector, and the polarity and frequency of the ramp voltage are controlled by the detected output so that the phase difference is 2 m$\pi$ rad (where m=0, ±1, ±2, ...), or zero (m=0), in general.

Figure 1:
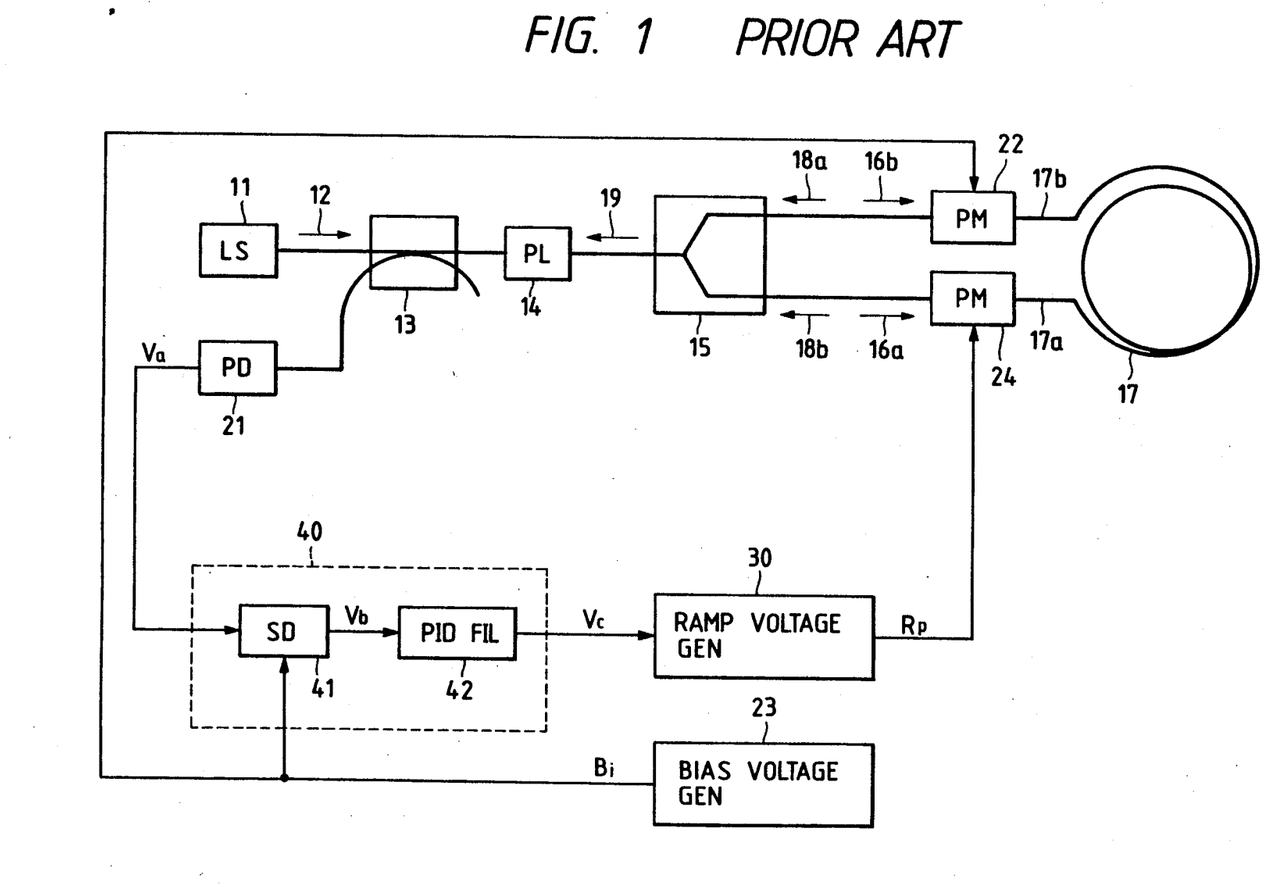
FIG. 1 is a block diagram showing a conventional fiber optic gyro.

FIG. 1 illustrates an example of such a conventional closed-loop-type, zero-method fiber optic gyro of a linear phase ramp method which employs a ramp voltage for phase modulation. Light 12 from a light source 11 is applied via an optical coupler 13 and a polarizer 14 to an optical splitter/coupler 15, by which the light 12 is split into two rays of light 16a and 16b. The two rays of light 16a and 16b enter an optical fiber coil 17 at one and the other end 17a and 17b thereof, respectively, and propagate therethrough as left-handed and right-handed light 17a and 17b, thereafter being emitted therefrom as rays of light 18a and 18b. These rays of light 18a and 18b are supplied to the optical splitter/coupler 15, wherein they interfere with each other, and the resulting interference light 19 is applied via the polarizer 14 and the optical coupler 13 to a photodetector 21, whereby it is converted into an electric signal.

A phase modulator 22 is provided between the optical splitter/coupler 15 and the terminating end 17b of the optical fiber coil 17 and is supplied with a bias voltage Bi from a bias voltage generator 23. Consequently, the light 16b which enters the optical fiber coil 17 at the terminating end 17b and the light 18a which is applied from the terminating end 17b of the optical fiber coil 17 to the optical splitter/coupler 15 after having propagated through the coil 17 are phase-shifted relative to each other. Further, a phase modulator 24 is provided between the optical splitter/coupler 15 and the terminating end 17a of the optical fiber coil 17 and is supplied with a ramp voltage Rp from a ramp voltage generator 30. Consequently, the light 16a which enters the optical fiber coil 17 at its terminating end 17a and the light 18b which is applied from the terminating end 17a of the optical fiber coil 17 to the optical splitter/coupler 15 after having propagated through the coil 17 are phase-shifted. The output voltage Va of the photodetector 21 is provided to a synchronous detector 41 which forms a phase difference detect and control circuit 40 and in which it is synchronously detected by the bias voltage Bi from the bias voltage generator 23. As a result of this, a voltage Vb which corresponds to the phase difference $\Delta\phi$ between the two rays of light 18a and 18b coupled together by the optical splitter/coupler 15 is detected by the synchronous detector 41 and is applied to a PID (Proportional plus Integral plus Derivative) filter 42. The output voltage of the PID filter 42, that is, the output voltage Vc of the phase difference detect and control circuit 40, is supplied to the ramp voltage generator 30, controlling the polarity and frequency of the ramp voltage Rp so that the phase difference $\Delta\phi$ is reduced to zero.

The phase modulation in the phase modulator 22 by the biasing voltage Bi is intended to set the operation point of the fiber optic gyro so that the output voltage Vb of the synchronous detector 41 becomes proportional to the sine value of the phase difference $\Delta\phi$ as follows.

$$Vb = K \sin \Delta\phi \qquad (1)$$

where K is a constant.

The phase difference $\Delta\phi$ is expressed as the sum of a Sagnac phase difference $\Delta\phi_s$ resulting from the application of angular velocity $\Omega$ to the optical fiber coil 17 and a phase difference $\Delta\phi_p$ resulting from the application of the ramp voltage Rp to the phase modulator 24 as follows:

$$\Delta\phi = \Delta\phi_s + \Delta\phi_p \qquad (2)$$

As is well-known, the Sagnac phase difference $\Delta\phi_s$ is expressed as follows:

$$\Delta\phi_s = \frac{4\pi RL}{\lambda C} \Omega \qquad (3)$$

where R is the radius of the optical fiber coil 17, L is the length of the optical fiber coil 17, $\lambda$ is the wavelength of light which propagates through the optical fiber coil 17 and C is the light velocity in a vacuum.

Figure 2:
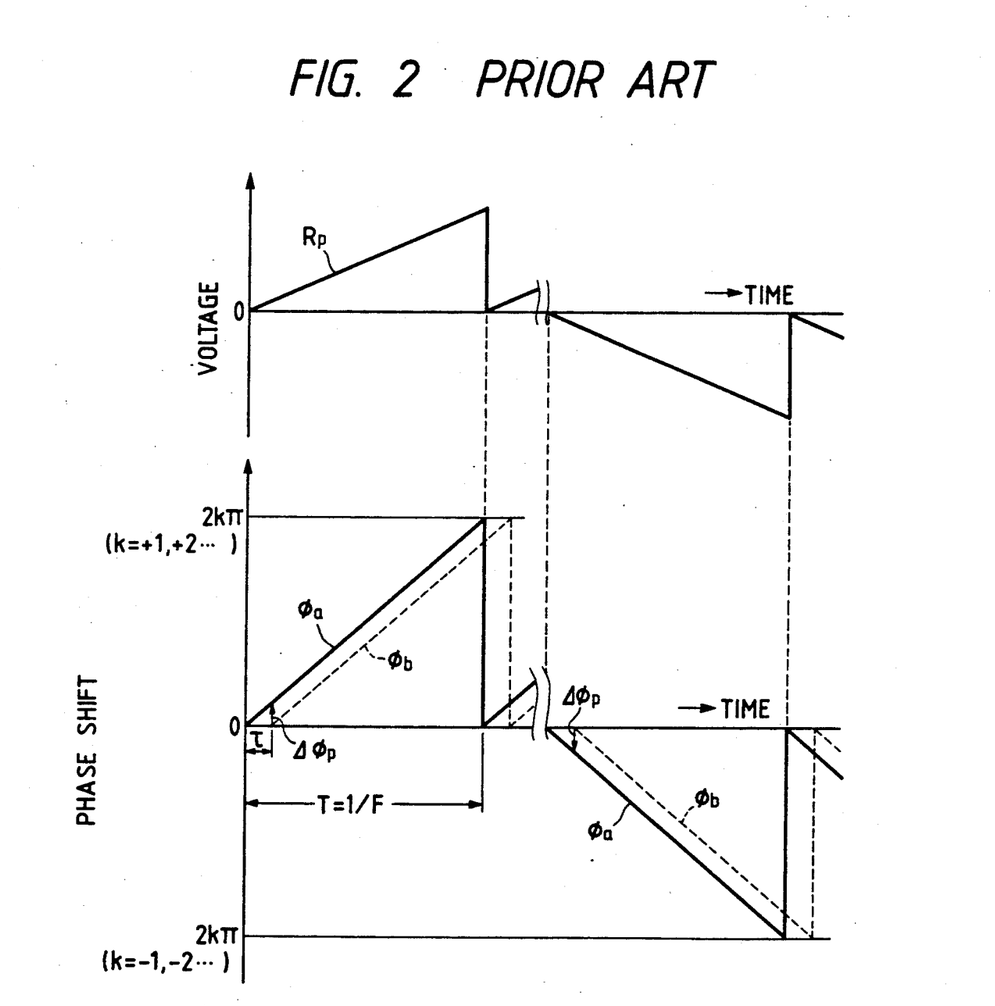
FIG. 2 is a ramp voltage waveform diagram for explaining the operation of the fiber optic gyro depicted in FIG. 1.

The ramp voltage Rp is a positive or negative sawtooth voltage as shown at the upper left or right-hand side in FIG. 2, and a maximum or minimum value of the ramp voltage corresponding to its peak value is selected such that the width of the phase shift $\Delta\phi$ of light by the phase modulator 24 is 2k$\pi$ rad (where k=±1, ±2, ...), in general and usually ±2$\pi$ rad.

For example, where the input angular velocity $\Omega$ is applied in the left-handed direction and the Sagnac phase difference $\Delta\phi_s$ goes negative, the ramp voltage Rp is controlled to be a positive sawtooth voltage by the output voltage Vc of the phase difference detect and control circuit 40. In this instance, the phase shift $\phi_a$, which is caused by the phase modulator 24 in the light 16a which enters the optical fiber coil 17 at its terminating end 17a, and the phase shift $\phi_b$, which is caused by the phase modulator 24 in the light 18b which is applied to the optical splitter/coupler 15 from the terminating end 17a of the optical fiber coil 17 after propagating therethrough, bear such a relationship as indicated by the solid and broken lines at the lower left-hand side in FIG. 2, and the phase difference $\Delta\phi_p$ which results from the application of the ramp voltage Rp to the phase modulator 24 goes positive. Where the input angular velocity $\Omega$ is applied in the right-handed direction and the Sagnac phase difference $\Delta\phi_s$ goes positive, the ramp voltage Rp is controlled to be a negative sawtooth voltage by the output voltage Vc of the phase difference detect and control circuit 40. In this instance, the above-mentioned phase shifts $\phi_a$ and $\phi_b$ bear such a relationship as indicated by the solid and broken lines at the lower right-hand side in FIG. 2, and the above-mentioned phase difference $\Delta\phi_p$ goes negative. In FIG. 2, $\tau$ is the time necessary for the propagation of light through the optical fiber coil 17.

Thus, letting the period and frequency of the ramp voltage Rp be represented by T and f, respectively, it follows that $$\Delta \phi_p = 2k\pi \frac{\tau}{T} = 2k\pi \cdot \tau \cdot f \qquad (4)$$

as is evident from FIG. 2. Letting the refractive index of light in the optical fiber coil 17 be represented by n, the following relationship exists:

$$\tau = \frac{nL}{C} \qquad (5)$$

Hence, it follows that $$\Delta \phi_p = 2k\pi \frac{nL}{C} f \qquad (6)$$

Thus, by controlling the polarity and frequency f of the ramp voltage Rp so that the phase difference $\Delta \phi$ expressed by Eq. (2) is reduced to zero, it follows, from Eqs. (6) and (3) and $\Delta \phi_p = -\Delta \phi_s$, that $$\begin{aligned}
f &= \frac{C}{2k\pi \cdot nL} \Delta \phi_p \qquad (7)\\
&= -\frac{C}{2k\pi \cdot nL} \Delta \phi_s \\
&= -\frac{C}{2k\pi \cdot nL} \cdot \frac{4\pi RL}{\lambda C} \Omega \\
&= -\frac{2R}{kn\lambda} \Omega
\end{aligned}$$

The input angular velocity $\Omega$ is given as follows:

$$\Omega = -\frac{kn\lambda}{2R} f \qquad (8)$$

In the case where the input angular velocity $\Omega$ is applied in the left-handed direction, i.e. the negative direction and the ramp voltage Rp becomes a positive sawtooth voltage, however, k becomes a positive integer, and in the case where the input angular velocity $\Omega$ is applied in the right-handed direction, i.e. the positive direction and the ramp voltage Rp becomes a negative sawtooth voltage, k becomes a negative integer.

Thus, the direction and magnitude of the input angular velocity $\Omega$ can be measured from the polarity and frequency f of the ramp voltage Rp.

The phase modulator 24 usually has an optical waveguide formed as by diffusing titanium into an electro-optic crystal as of lithium niobate and a pair of electrodes across which voltage for modulation use is applied. The phase shift amount of light by such a phase modulator is proportional to the product $\gamma$ Vp of the electro-optic constant $\gamma$ of the electro-optic crystal and the applied voltage Vp. The electro-optic constant $\gamma$ is temperature dependent and has a temperature coefficient of about 500 ppm/°C. though somewhat different according to the direction of cut of the electro-optic crystal. Accordingly, the phase shift amount of light in the phase modulator varies with temperature, even if the applied voltage Vp is constant.

In the prior art fiber optic gyro described above with respect to FIG. 1, a maximum or minimum value of the ramp voltage Rp which is applied to the phase modulator 24 from the ramp voltage generator 30 is fixed at such a value that a maximum phase shift of light in the phase modulator 24 by the ramp voltage Rp is $2k\pi$ rad at a specified temperature of 15° C., for example. Hence, if the temperature of the fiber optic gyro, and consequently the temperature of the phase modulator 24 deviates from the specified temperature owing to an environmental change, the electro-optic constant $\gamma$ of the electro-optic crystal forming the phase modulator 24 changes, resulting in the maximum phase shift deviating from $2k\pi$ rad. In consequence, the relationship between the input angular velocity $\Omega$ and the frequency f of the ramp voltage Rp, defined by Eq. (7) or (8) is lost, inducing a scale factor error in the output of the fiber optic gyro.

Figure 3:
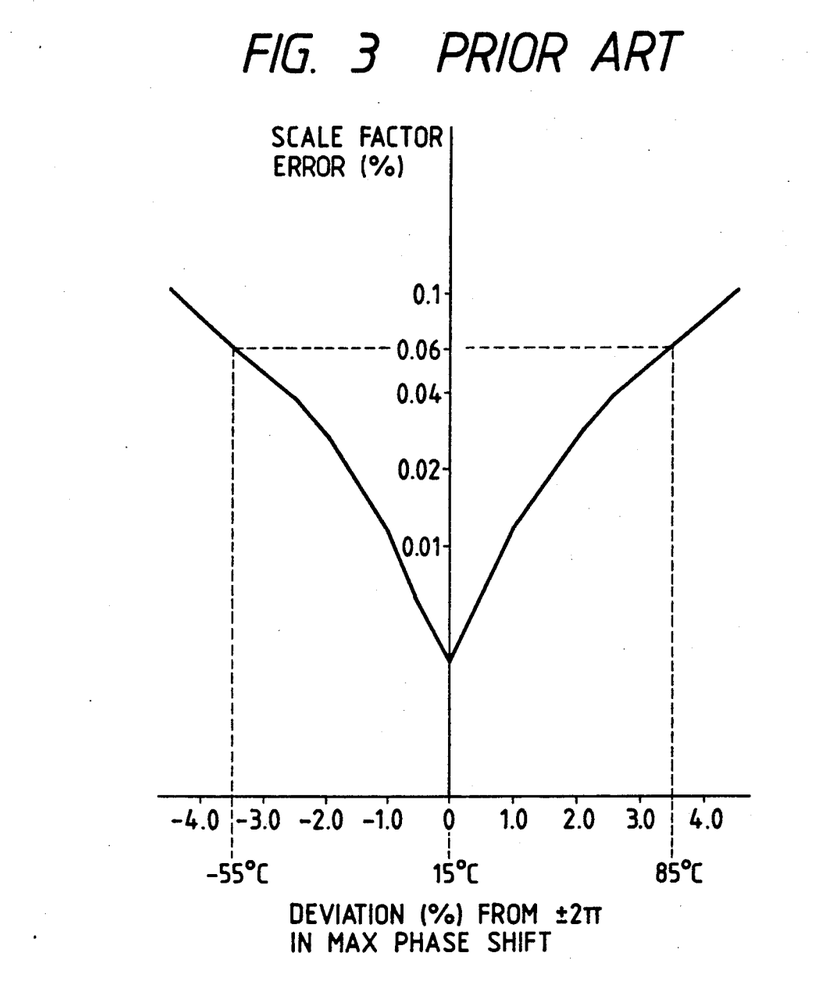
FIG. 3 is a graph showing a scale factor error by the fiber optic gyro depicted in FIG. 1.

FIG. 3 shows the scale factor error in the conventional fiber optic gyro in the case where the peak value of the ramp voltage Rp was set so that the maximum phase shift would be $\pm 2\pi$ rad at 15° C. When the temperature of the fiber optic gyro is 15°±70° C., that is, +85° C. or −55° C., the maximum phase shift deviates about 3.5% from $\pm 2\pi$ rad and the scale factor error is as large as approximately 0.06%. In the case where the ramp voltage Rp is a sawtooth voltage as mentioned above, however, a fly-back time exists in the sawtooth voltage, in practice; strictly speaking, Eq. (4) does not hold at a specified temperature and a scale factor error occurs in the output of the fiber optic gyro. FIG. 3 shows the case where the flyback time of the ramp voltage Rp was selected as short as 50 nanosec so that the scale factor error by the flyback time of the ramp voltage Rp would be negligibly small. Hence, the scale factor error shown in FIG. 3 is almost due entirely to the deviation of the maximum phase shift from $\pm 2\pi$ rad.

SUMMARY OF THE INVENTION

It is therefore an object of the present invention to provide a closed-loop-type, zero-method fiber optic gyro in which substantially no scale factor error is induced in its output by a temperature change in the constant of the phase modulator when the temperature of the fiber optic gyro stays within a predetermined temperature range.

The closed-loop-type, zero-method fiber optic gyro according to the present invention includes a temperature sensor for sensing the temperature of the gyro, and a peak value control circuit which controls the peak value of the ramp voltage according to the output of the temperature sensor so that the maximum phase shift of light in the phase modulator supplied with the temperature compension ramp voltage is an integral multiple of $2\pi$ rad regardless of the temperature of the gyro when it stays within a predetermined temperature range.

According to such a fiber optic gyro of the present invention, since the peak value of the ramp voltage is controlled so that the maximum phase shift of light in the phase modulator supplied with the ramp voltage is an integral multiple of $2\pi$ rad within a predetermined temperature range regardless of the temperature of the gyro, its output is almost free from scale factor errors caused by a temperature change in the constant of the phase modulator supplied with the ramp voltage.

DESCRIPTION OF THE PREFERRED EMBODIMENTS

Figure 4:
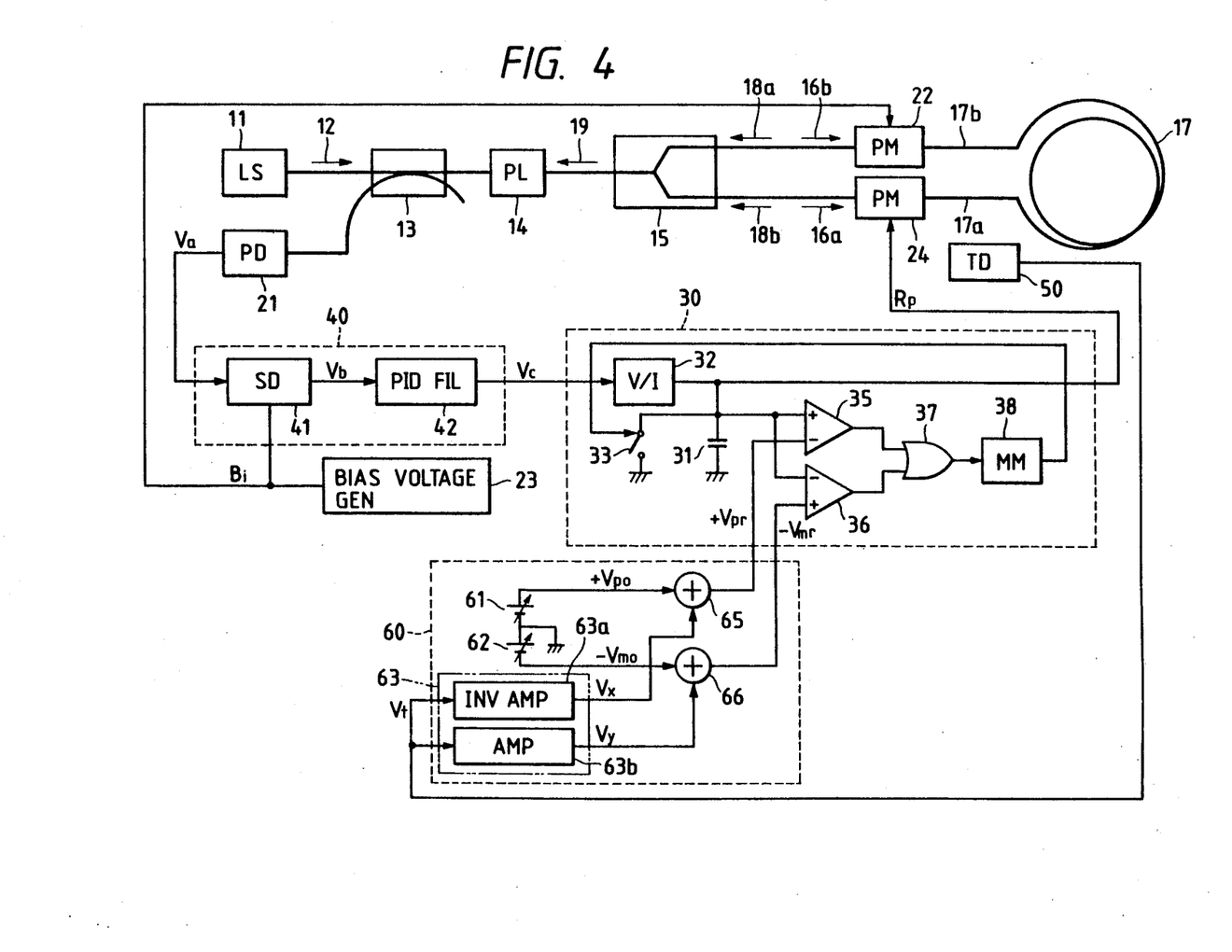
FIG. 4 is a block diagram illustrating an embodiment of the fiber optic gyro of the present invention.

FIG. 4 illustrates in block form an embodiment of the fiber optic gyro of the present invention, which is of a linear phase ramp method employing a ramp voltage for phase modulation. This embodiment is identical with the prior art example of FIG. 1 in the provision of the light source 11, the optical coupler 13, the polarizer 14, the optical splitter/coupler 15, the optical fiber coil 17, the photodetector 21, the phase modulator 22 which is supplied with the bias voltage Bi, the bias voltage generator 23, the phase modulator 24 which is supplied with the ramp voltage Rp, the ramp voltage generator 30 and the phase difference detect and control circuit 40. The operation principle of this embodiment is also identical with the operation principle of the prior art example except that the peak value of the ramp voltage Rp is controlled as described later.

The phase modulator 24 is formed of an electro-optic crystal whose electro-optic constant $\gamma$ has a positive temperature coefficient, such as lithium niobate, in this example.

The ramp voltage generator 30 in this example comprises a capacitor 31, a voltage-current converter 32 whereby the output voltage Vc, which is the input voltage to the ramp voltage generator 30, is converted into a current for input into the capacitor 31, a switch 33 for discharging the capacitor 31, a voltage comparator 35 for comparing the charging voltage of the capacitor 31 with a positive reference voltage $+Vpr$, a voltage comparator 36 for comparing the charging voltage of the capacitor 31 with a negative reference voltage $-Vmr$, an OR gate 37 for ORing the outputs of the voltage comparators 35 and 36, and a monostable multivibrator 38 which is triggered by the output of the OR gate 37 to hold the switch 33 in the ON state for a short time. When the output voltage Vc of the phase difference detect and control circuit 40 is positive, the capacitor 31 is charged positive, and when the charging voltage reaches the reference voltage $+Vpr$, the output of the voltage comparator 35 and consequently the output of the OR gate 37 goes high, triggering the monostable multivibrator 38. As a result of this, the switch 33 is held ON for a short time, during which the capacitor 31 is discharged, and thereafter it is charged again. Thus, a positive sawtooth voltage whose maximum value is equal to the reference voltage $+Vpr$, is developed as the ramp voltage Rp across the capacitor 31. When the output voltage Vc of the phase difference detect and control circuit 40 is negative the capacitor 31 is charged negative, and when the charging voltage reaches the reference voltage $-Vmr$, the output of the voltage comparator 35 and consequently the output of the OR gate 37 goes high, triggering the monostable multivibrator 38. As a result of this, the switch 33 is held ON for a short time, during which the capacitor 31 is discharged, and thereafter it is charged again. Thus, a negative sawtooth voltage whose minimum value is equal to the reference voltage $-Vmr$, is developed as the ramp voltage Rp across the capacitor 31.

In this instance, a switching element which is sufficiently small both in the leak current during its OFF state and in the resistance during its ON state, such as a field effect transistor, is employed as the switch 33. Further, the time constant of the monostable multivibrator 38 is set such that the ON-state period of the switch 33, that is, the flyback period of the ramp voltage Rp is sufficiently short, for example, 50 nsec or so.

The present invention employs a temperature sensor 50 and a peak value control circuit 60.

The temperature sensor 50 is used to detect the temperature of the fiber optic gyro, in particular, the temperature of the phase modulator 24. The temperature sensor 50 may preferably be disposed near the phase modulator 24 but may also be located at some other place where temperature is nearly equal to that of the phase modulator 24. Now, let it be assumed that the temperature of the fiber optic gyro varies within a range from $-54°$ C. to $+85°$ C. according to environmental conditions. The temperature sensor 50 is designed so that its detected voltage Vt varies linearly with temperature, for example, zero (the ground potential) at a reference temperature 25° C., positive above 25° C. and negative below 25° C. as shown in FIG. 5.

The peak value control circuit 60 is used to control the peak value of the ramp voltage Rp according to the above temperature detected voltage Vt so that the maximum phase shift of light in the phase modulator 24 is $2k\pi$ rad (where $k=\pm 1, \pm 2, \ldots$), i.e. $\pm 2\pi$ rad in this example, regardless of the temperature of the fiber optic gyro when it stays within a predetermined range, that is, within a range of from $-54°$ to $+85°$ C. in this example. The peak value control circuit 60 in this embodiment is made up of a voltage source 61 for providing a positive voltage $+Vpo$, a voltage source 62 for providing a negative voltage $-Vmo$, a correction voltage generator 63 for deriving correction voltages Vx and Vy, described later, from the detected voltage Vt, an adder 65 for adding the correction voltage Vx to the voltage $+Vpo$, and an adder 66 for adding the correction voltage Vy to the voltage $-Vmp$. The correction voltage generator 63 includes an inverting amplifier 63a for amplifying the detected voltage Vt in the reverse polarity to provide the correction voltage Vx and an amplifier 63b for amplifying the detected voltage Vt to provide the correction voltage Vy. Provision is made for adjusting the gain of at least one of the amplifiers 63a and 63b so that the correction voltages Vx and Vy depicted in FIG. 5 are opposite in gradient (opposite in polarity) and equal in magnitude. The output voltages of the adders 65 and 66 are used as the reference voltages $+Vpr$ and $-Vmr$ which are applied to the voltage comparators 35 and 36 of the ramp voltage generator 30.

In FIG. 4 the gain of each of the adders 65 and 66 may be 1. In such a case, when the temperature of the fiber optic gyro is 25° C. which is the reference temperature, the correction voltages Vx and Vy are zero as described later and the voltages $+Vpo$ and $-Vmo$ are provided intact as the reference voltages $+Vpr$ and $-Vmr$ to the voltage comparators 35 and 36. Consequently, the peak value or maximum value of the positive ramp voltage Rp is the voltage +Vpo and the minimum value of the negative ramp voltage Rp is the voltage −Vmo. These voltage values are selected such that maximum phase shifts of light by the phase modulator 24 are +2π rad and −2π rad, respectively.

Figure 5:
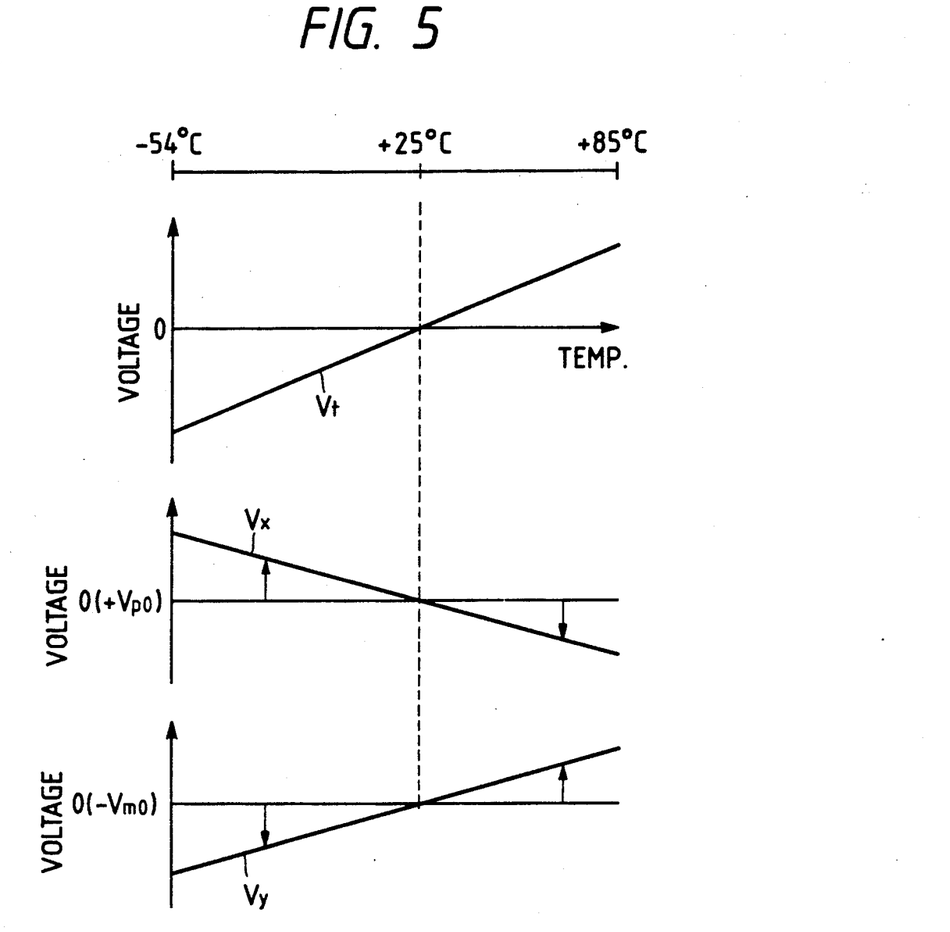
FIG. 5 is a graph showing the relationship between temperature and a correction voltage in the embodiment of FIG. 4.

The correction voltage Vx is for correcting the positive ramp voltage Rp and varies linearly as shown in FIG. 5, in which the voltage Vx is zero when the detected voltage Vi from the temperature sensor 50 is zero, that is, the temperature of the fiber optic gyro is 25° C., and the voltage Vx goes negative and positive when the temperature of the fiber optic gyro is above and below 25° C., respectively. In other words, the voltage Vx is proportional to the detected voltage Vt but opposite in polarity. The values of the voltage Vx are selected such that when the electro-optic constant γ of the electro-optic crystal forming the phase modulator 24 varies with temperature, the resulting change in the phase shift amount of light in the phase modulator 24 is cancelled.

The correction voltage Vy is for correcting the negative ramp voltage Rp and is proportional to the detected voltage Vt in the same polarity as shown in FIG. 5. The value of the voltage Vy is selected such that when the electro-optic constant γ of the electro-optic crystal forming the phase modulator 24 changes with temperature, the resulting change in the phase shift amount of light in the phase modulator 24 is cancelled.

Figure 6:
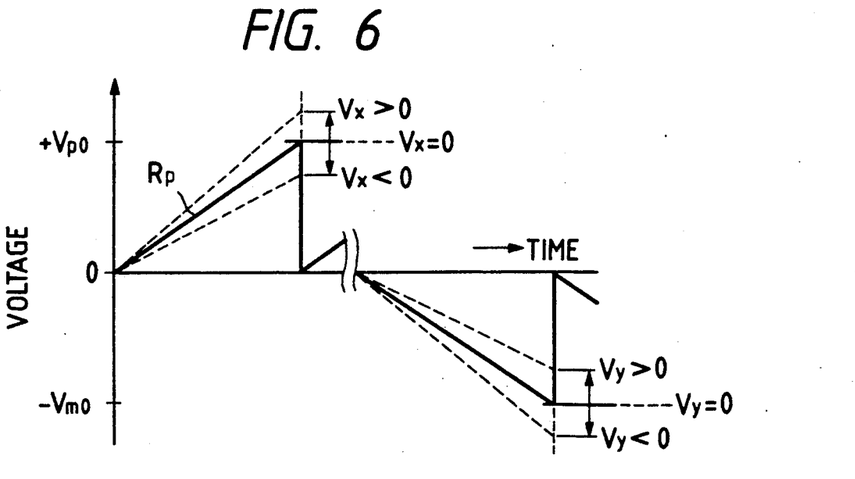
FIG. 6 is a waveform diagram for explaining the correction of the peak value of the ramp voltage.

In the case where the Sagnac phase difference $\Delta\phi_s$ is negative and the output voltage Vc of the phase difference detect and control circuit 40 is positive and consequently a positive ramp voltage Rp is being generated, the peak value of the ramp voltage Rp is the sum of the voltage +Vpo and the correction voltage Vx as depicted at the left-hand side in FIG. 6. Accordingly, the maximum value of the ramp voltage Rp is corrected so that the maximum phase shift of light in the phase modulator 24 is always +2π rad even if the temperature of the fiber optic gyro varies within the aforementioned range from −54° C. to +85° C. In the case where the Sagnac phase difference $\Delta\phi_s$ is positive and the output voltage Vc of the phase difference detect and control circuit 40 is negative and consequently a negative sawtooth voltage is being generated as the ramp voltage Rp, the peak value or minimum value of the ramp voltage Rp is the sum of the voltage −Vmo and the correction voltage Vy as depicted at the right-hand side in FIG. 6. Accordingly, the peak value of the ramp voltage Rp is corrected so that the maximum phase shift of light in the phase modulator 24 is always −2π rad even if the temperature of the fiber optic gyro varies within the afore-mentioned range from −54° C. to +85° C. By measuring the polarity and frequency f of the thus obtained ramp voltage Rp through use of a known method, the direction and magnitude of acceleration applied to the optical fiber coil 17 can be calculated from Eq. (8). No particular method for measuring the polarity and frequency of the ramp voltage Rp is described and shown, because any known methods can be used. As described above, no scale factor error is induced in the output of the fiber optic gyro by a temperature change in the electro-optic constant γ of the electro-optic crystal forming the phase modulator 24.

In the above arrangement, since the correction voltages Vx and Vy are set on the assumption that the temperature detected by the temperature sensor 50 is equal to the temperature of the phase modulator 24, when the temperature sensed by the temperature sensor 50 differs from the temperature of the phase modulator 24, the maximum phase shift of light in the phase modulator 24 deviates from ±2π rad and a temperature change in the electro-optic constant γ of the electro-optic crystal forming the phase modulator 24 will induce a scale factor error in the output of the fiber optic gyro. In practice, however, the difference between the temperature sensed by the temperature sensor 50 and the temperature of the phase modulator 24 is so small that the maximum phase shift of light in the phase modulator 24 remains substantially equal to ±2π rad, and hence the resulting scale factor error is very slight.

The peak value control circuit 60 may be of an arrangement in which the aforementioned reference voltages +Vpr and −Vmr are derived directly from the detected voltage Vt of the temperature sensor 50. Moreover, the PID filter 42 in the phase difference detect and control circuit 40 may be replaced with an electric filter having the same function.

Figure 7:
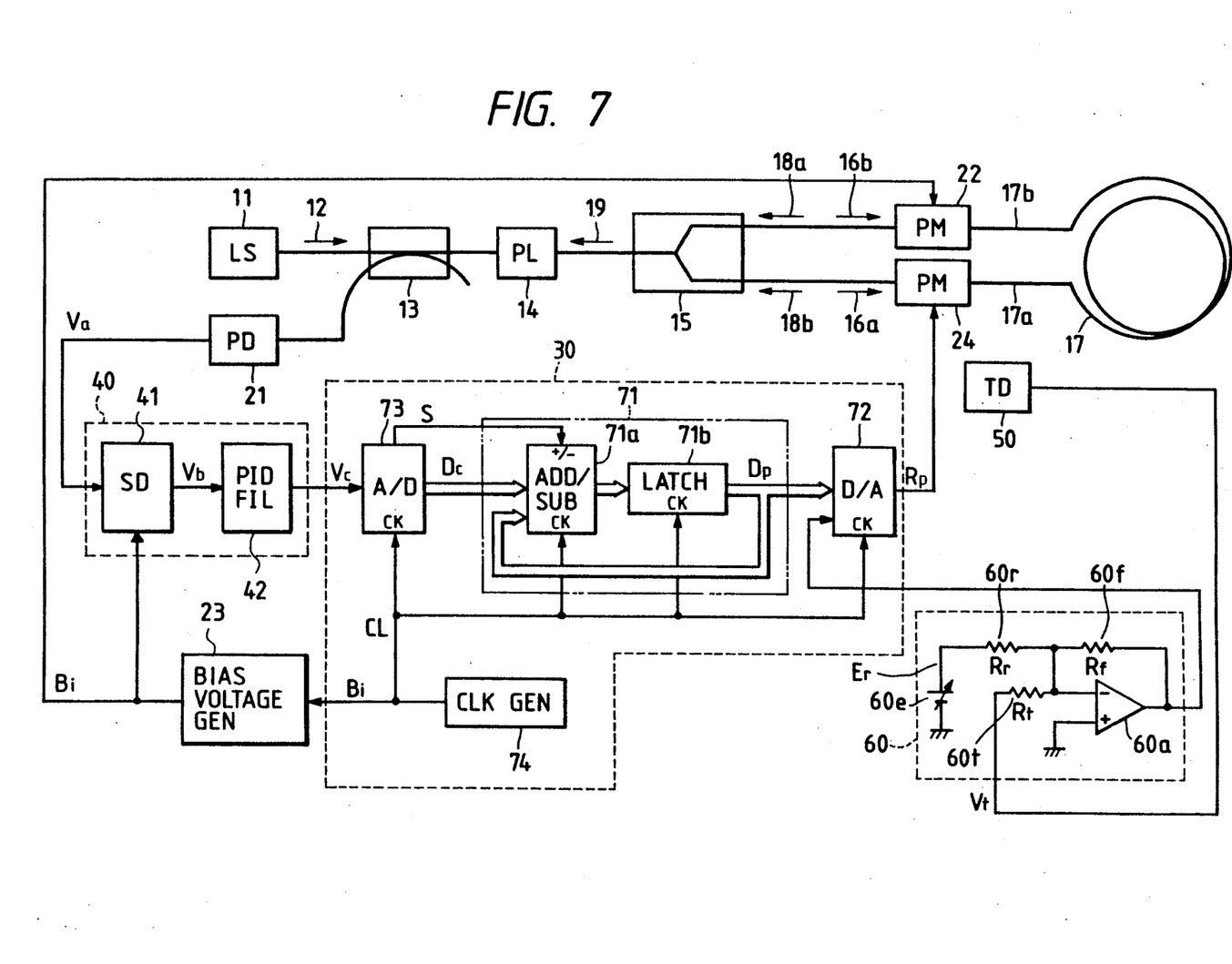
FIG. 7 is a block diagram illustrating another embodiment of the fiber optic gyro.

FIG. 7 illustrates in block form another embodiment of the fiber optic gyro of the present invention, in which the analog ramp voltage generator 30 used in the FIG. 4 embodiment is replaced by a digital ramp voltage generator 30 which uses a staircase wave.

The digital ramp voltage generator 30 comprises an AD converter 73 for converting the output voltage Vc of the phase difference detect and control circuit 40 into a digital value Dc, a digital ramp voltage generator 71 for generating a digital ramp voltage Dp which uses the digital value Dc as its step width, a DA converter 72 for converting the digital ramp voltage Dp into an analog ramp voltage Rp, and a clock generator 74 for applying an operation clock CL to the AD converter 73, the digital ramp voltage generator 71 and the DA converter 72. The digital ramp voltage generator 71 includes an adder/subtractor 71a which is supplied at one input with the output Dc of the AD converter 73 and a latch 71b for holding the output of the adder/subtractor 71a. The output of the latch 71b is provided to the DA converter 72 and the other input of the adder/subtractor 71a. The adder/subtractor 71a is switched between additive and subtractive operations by a sign bit S in the output of the AD converter 73, namely, the adder/subtractor 71a performs subtraction or addition depending on whether the sign bit S is a "0" or "1", for instance.

When the output voltage Vc of the phase difference detect and control circuit 40 is applied to the digital ramp voltage generator 30 constructed as described above, the voltage Vc is converted by the AD converter 73 into the digital voltage value Dc upon each occurrence of the clock CL. The digital voltage value Dc is provided to the adder/subtractor 71a, together with the sign bit S, by which its addition to or subtraction from the output Dp of the latch 71b, which has latched therein the output of the adder/subtractor 71a one clock before, is performed in accordance with the state of the sign bit S for each clock. For instance, in the case where the input voltage Vc is positive, and hence the sign bit S output from the AD converter 73 is a "1", the digital voltage value Dc and the output value Dp of the latch 71b are added together by the adder/substractor 71b and the added result is latched in the latch 71b, from which it is output upon the next occurrence of the clock CL. In consequence, the output of the latch 71b gradually increases by a step of the value Dc upon each occurrence of the clock CL. Yet, when the sum of the latest output value Dp of the latch 71b and the input digital value Dc exceeds a maximum value dependent upon the number of digital (or the number of bits) of the adder/subtractor 71a acting as an adder, the carry is discarded, and consequently, the output of the adder/subtractor 71a goes down to a value smaller than the value Dc. Then the cumulative addition by the step of the value Dc is performed again by the combination of the adder/subtractor 71a and the latch 71b upon each occurrence of the clock CL, starting from the abovesaid reduced value. In other words, the digital ramp voltage generator 71 creates a digital ramp voltage which sequentially increases stepwise by the value Dc. The maximum value of the ramp voltage Rp is dependent on the number of bits of the adder/subtractor 71a. Also in the case where the adder/subtractor 71a operates as a subtractor, a negative stair step digital ramp voltage is similarly produced.

The output voltage Dp of the digital voltage generator 71 is applied to the phase modulator 24 after being converted by the DA converter 72 into the analog voltage Rp. In this case, the output voltage $V_R$ of the peak value control circuit 60 is applied as an analog reference voltage of the DA converter 72. The DA converter 72 is a multiplying type DA converter, which outputs an analog voltage which is equal to the product of the input digital value Dp and the analog reference voltage $V_R$. Since the analog reference voltage $V_R$ output from the peak value control circuit 60 varies with the detected voltage Vt of the temperature sensor 50, the output voltage of the DA converter 72, that is, the ramp voltage Rp, also varies, and consequently, the peak value of the ramp voltage Rp also varies correspondingly. The peak value control circuit 60 is designed for adding and amplifying a reference voltage Er from reference voltage source 60e and the detected voltage Vt from the temperature sensor 50. In this embodiment, letting the resistance values of a feedback resistor 60f and input resistors 60r and 60t be represented by Rf, Rr and Rt, respectively, and assuming that the gain of an operational amplifier 60a is very large, the output voltage $V_R$ of the adder/amplifier or peak value control circuit 60 is substantially expressed as follows:

$$V_R = -\{(Rf/Rr) \cdot Er + (Rf/Rt) \cdot Vt\},$$

where (Rf/Rr)·Er corresponds to the voltage Vpo or Vmo in the peak value control circuit 60 in FIG. 4 and (Rf/Rt)·Vt corresponds to the correction voltage Vx or Vy. By a suitable selection of the value of Rf/Rt, the slope of the voltage Vx or Vy shown in FIG. 5 can be set as desired. Further, the center temperature in the operation temperature range can be set as desired by a suitable selection of the value of (Rf/Rr). Incidentally, the same circuit arrangement as the adder/amplifier 60 including the operational amplifier 60a and the resistors 60f, 60r and 60t can be used as each of the adders 65 and 66 in the peak value control circuit 60 shown in FIG. 4.

Figure 8:
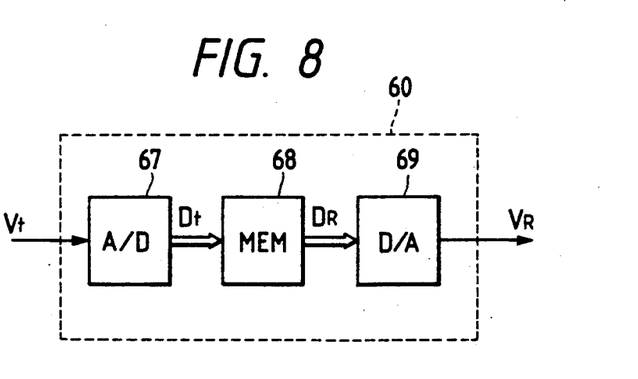
FIG. 8 is a block diagram showing a modified form of a peak value control circuit 60.

In the embodiment depicted in FIG. 7, the peak value control circuit 60 may have such an arrangement as shown in FIG. 8. In this instance, the relationship between the detected voltage Vt of the temperature sensor 50 and the output voltage $V_R$ V of the peak value control circuit 60 is prestored in a memory 68, the detected voltage Vt is converted by an AD converter 67 into a digital value Dt for input as an address into the memory 68 to read out therefrom the corresponding digital value $D_R$, which is converted by a DA converter 69 into an analog voltage for use as the output voltage $V_R$ of the peak value control circuit 60. With the use of the memory 68, it is possible to perform not only a correction linearly approximate to temperature as by the correction voltages Vx and Vy but also a correction with more accurate curves. It is apparent that the peak value control circuit 60 in FIG. 4 may be implemented by such a memory which has stored therein correction characteristics for temperature.

Also in the embodiment shown in FIG. 7, the peak value of the ramp voltage Rp can be controlled according to the detected voltage Vt of the temperature sensor 50 so that the maximum phase shift of light in the phase modulator 24 is $\pm 2\pi$ rad regardless of the temperature of the fiber optic gyro as long as it stays within the aforementioned range of from $-54°$ C. to $+85°$ C. Accordingly, also in this embodiment, the output of the fiber optic gyro is almost free from the scale factor error by a temperature change in the electro-optic constant $\gamma$ of the electro-optic crystal forming the phase modulator 24.

The PID filter 42 may be replaced with an electric filter which has the same function as the filter 42, and the function of the PID filter 42 or electric filter may be performed in the digital ramp voltage generator 71.

As described above, the present invention includes a temperature sensor for sensing the temperature of the fiber optic gyro and a peak value control circuit which controls the peak value of the ramp voltage so that the maximum phase shift of light in the phase modulator supplied with the ramp voltage is an integral multiple of $2\pi$ rad regardless of the temperature of the fiber optic gyro when it stays within a predetermined temperature range. This ensures that substantially no scale factor error is induced in the output of the fiber optic gyro by a temperature change in the constant of the phase modulator when the temperature of the fiber optic gyro is withing the predetermined range.

It will be apparent that many modifications and variations may be effected without departing from the scope of the novel concepts of the present invention.

What is claimed is:

1. A fiber optic gyro comprising:
   an optical fiber coil;
   a light source;
   optical splitter/coupler means whereby light from said light source is split into two for input into said optical fiber coil at opposite ends thereof respectively, and said two rays of light having propagated through said optical fiber coil in opposite directions and output therefrom are caused to interfere with each other;
   photodetector means for detecting said interference light output from said optical splitter/coupler means;
   a phase modulator disposed between said optical splitter/coupler means and one end of said optical fiber coil;
   ramp voltage generating means for generating a ramp voltage for phase modulation use which is applied to said phase modulator;
   phase difference detect and control means for detecting from the output of said photodetector means the phase difference between said two rays of light output from said optical fiber coil which interfere with each other in said optical splitter/coupler means and whereby the polarity and frequency of said ramp voltage to be generated by said ramp voltage generating means are controlled according to said phase difference detected output so that said phase difference is 2 m$\pi$ rad (where m=0, ±1, ±2, . . .);

temperature sensor means for sensing the temperature of said fiber optic gyro; and peak value control means supplied with the output of said temperature sensor means, for controlling the peak value of said ramp voltage according to said output of said temperature sensor means so that a maximum phase shift of light in said phase modulator is an integral multiple of 2$\pi$ rad regardless of the temperature of said fiber optic gyro when said gyro temperature stays within a predetermined temperature range.

2. The fiber optic gyro of claim 1 wherein said peak value control means includes positive reference voltage generating means for generating a positive reference voltage corresponding to said detected voltage of said temperature sensor means and negative reference voltage generating means for generating a negative reference voltage corresponding to said detected voltage of said temperature sensor means, and wherein said ramp voltage generating means is supplied with said positive reference voltage and said negative reference voltage, for generating said ramp voltage having a peak value of either said positive or negative reference voltage depending on the polarity of said ramp voltage controlled by said phase difference detect and control means.

3. The fiber optic gyro of claim 2 wherein said positive reference voltage generating means includes: first correcting voltage generating means supplied with the detected output voltage of said temperature sensor means for amplifying said detected output voltage in the reverse polarity to generate a first correction voltage, first voltage generating means for generating a positive voltage, and first adder means supplied with said positive voltage and said first correction voltage for adding them together to provide the added output as said positive reference voltage; and wherein said negative reference voltage generating means includes: second correcting voltage generating means supplied with the detected output voltage of said temperature sensor means for amplifying said detected output voltage to generate a second correction voltage, second voltage generating means for generating a negative voltage, and second adder means supplied with said negative voltage and said second correction voltage for adding them together to provide the added output as said negative reference voltage.

4. The fiber optic gyro of claim 3, wherein said ramp voltage generating means includes: voltage-current converter means for converting the output voltage of said phase difference detect and control means into a corresponding current; a capacitor supplied with the output current of said voltage-current converter means, for charging it; first comparator means formed by an operational amplifier having a non-inverting input supplied with the charging voltage of said capacitor and an inverting input supplied with said positive reference voltage; second comparator means formed by an operational amplifier having an inverting input supplied with the charging voltage of said capacitor and a non-inverting input supplied with said negative reference voltage; pulse generating means for generating pulses in response to the output of said first and second comparator means; and switching means for discharging said capacitor in response to said output pulses of said pulse generating means.

5. The fiber optic gyro of claim 1, wherein said ramp voltage generating means includes: clock generating means for generating a clock signal; an AD converter for converting the output voltage of said phase difference detect and control means into a digital value upon each occurrence of said clock signal; a digital ramp voltage generator whereby a stair step digital ramp voltage of a step width corresponding to said output digital value of said AD converter is generated upon each occurrence of said clock signal, and a DA converter supplied with said digital ramp voltage, for converting it into an analog voltage upon each occurrence of said clock signal to provide said analog voltage as said ramp voltage from said ramp voltage generating means, said DA converter being supplied with the output voltage from said peak value control means as a reference voltage for conversion.

6. The fiber optic gyro of claim 5, wherein said digital ramp voltage generator includes: an adder/subtractor supplied with the output digital voltage of said AD converter and the output digital ramp voltage of said digital voltage generator, for adding the former to or subtracting it from the latter in dependence on the value of a sign bit output from said AD converter; and a latch for latching the output of said adder/subtractor upon each occurrence of said clock signal and for outputting said latched output as said digital ramp voltage upon occurrence of the next clock signal.

7. The fiber optic gyro of claim 5 or 6, wherein said peak value control means includes: a reference voltage source for generating a fixed reference voltage; and adder/amplifier means for adding and amplifying the detected voltage of said temperature sensor means and said fixed reference voltage, the output of said adder/amplifier means being applied as said conversion reference voltage to said DA converter.

8. The fiber optic gyro of claim 5 or 6, wherein said peak value control means includes: a second AD converter for converting the detected voltage of said temperature sensor means into a digital value; a memory having stored therein a corrected digital reference voltage value for each detected voltage of said temperature sensor means; and a second DA converter supplied with said digital reference voltage read out of said memory, using the output of said AD converter as an address, for converting said digital reference voltage into analog form for output as said conversion reference voltage.

* * * * *